(12) United States Patent
Matranga et al.

(10) Patent No.: US 6,666,312 B2
(45) Date of Patent: Dec. 23, 2003

(54) MODULATABLE POWER TRANSMISSION CLUTCH AND A MARINE TRANSMISSION

(75) Inventors: Gerald Matranga, Franksville, WI (US); Andrew Clark, Lake Bluff, IL (US)

(73) Assignee: Twin Disc, Incorporated, Racine, WI (US)

( * ) Notice: Subject to any disclaimer, the term of this patent is extended or adjusted under 35 U.S.C. 154(b) by 0 days.

(21) Appl. No.: 10/128,755

(22) Filed: Apr. 24, 2002

(65) Prior Publication Data

US 2003/0201143 A1 Oct. 30, 2003

(51) Int. Cl.⁷ .............................................. F16D 25/10
(52) U.S. Cl. .................... 192/51; 192/52.4; 192/84 AA; 192/87.13; 192/109 F
(58) Field of Search ...................... 192/51, 52.4, 85 AA, 192/87.13, 87.18, 87.19, 109 F; 440/75

(56) References Cited

U.S. PATENT DOCUMENTS

| | | | |
|---|---|---|---|
| 4,186,829 A | 2/1980 | Schneider et al. | 192/109 |
| 4,451,238 A | 5/1984 | Arnold | 440/75 |
| 4,459,873 A | 7/1984 | Black | 74/720 |
| 4,836,809 A | 6/1989 | Pelligrino | 440/2 |
| 5,199,317 A * | 4/1993 | Moore et al. | 74/361 |
| 6,443,286 B1 * | 9/2002 | Bratel et al. | 192/85 AA |

\* cited by examiner

Primary Examiner—Richard M. Lorence
(74) Attorney, Agent, or Firm—Patterson, Thuente, Skaar & Christensen, L.L.C.

(57) ABSTRACT

A transmission housing having a modulatable power transmission therein which includes a clutch having interleaved clutch plates and having a central power transmitting shaft extending axially through the clutch. The clutch includes a fluid operated movable piston for effecting clutch operation by compression of the plates. The piston has a smaller piston area and a larger piston area, the smaller piston area has fluid flow directed to it at a variable fluid pressure whereby the clutch is modulatable. The larger piston area is adapted to have fluid flow directed thereto to effect maximum and unmodulatable engagement of the clutch. A spring loaded normally closed trigger valve controls fluid flow to the larger piston area in response to fluid pressure above a predetermined amount at the smaller piston area. The trigger valve is mounted on the outside of the transmission housing and is readily accessible for adjustment, for example. The trigger valve is normally closed so that pressure fluid is directed to the smaller piston area at a variable fluid pressure whereby the clutch is modulatable. When the valve is open by fluid pressure over a predetermined amount, the valve permits fluid flow to the larger piston area to effect maximum and unmodulatable engagement of the clutch for full clutch capacity.

4 Claims, 6 Drawing Sheets

MODULATABLE POWER TRANSMISSION CLUTCH AND A MARINE TRANSMISSION

BACKGROUND OF THE INVENTION

1. Field of Use

This invention relates generally to modulatable power transmission clutches and, in particular, to those wherein a fluid-applied spring release piston operates on clutch plates which are disposed between a rotatable driving member and a rotatable driven member to effect clutch modulation.

2. Description of the Prior Art

Each of the following U.S. patents and U.S. patent application has been assigned to an assignee common with the present application.

U.S. Pat. No. 4,451,238, issued May 29, 1984 to Arnold, discloses a multi-clutch transmission with forward and reverse shafts and gear trains between these shafts, and discusses the damaging shocks to the propulsion system which sometimes occur during maneuvering operations.

U.S. Pat. No. 4,459,873, issued Jul. 17, 1984 to Black, shows a marine propulsion system and discusses a brake which is engaged to anchor a portion of the planetary gear system to drive the propeller in a forward direction, and the brake is disengaged when the torque converter is driving the propeller shaft in the reverse direction. This patent discusses prior art transmissions, which were not always satisfactory because of flutter failure of the forward drive clutch, when it was required to operate in the reverse direction for reversing the direction of the boat.

U.S. Pat. No. 4,836,809, issued Jun. 6, 1989 to Pelligrino, discloses a marine vessel propulsion system having forward and reverse clutches in which each clutch can be fully engaged, fully disengaged, and modulated.

U.S. Pat. No. 4,186,829, issued Feb. 5, 1980 to Schneider and Pelligrino, discloses a modulatable power transmission clutch. This patent discloses a spring biased trigger valve, which is located radially outwardly of the central power transmission shaft on which the clutch is mounted and in the piston housing.

U.S. patent application Ser. No. 09/765,117, by the same inventors of the present invention, discloses a transmission of the present type but in which a trigger valve, or sequence valve is located in the central power shaft of the transmission.

SUMMARY OF THE PRESENT INVENTION

The present invention provides a modulatable power transmission clutch and also a marine transmission system for variable speed control having dual area clutch pistons. Clutch capacity is varied by separate fluid areas of the clutch, one area being smaller than the other. The marine transmission clutch is modulated by means of the small area of the piston utilizing a selectively operable control resulting in variable propeller speed. Pressure fluid is supplied to the small area by controlling a proportional valve. Modulation of the clutch offers enhanced docking control and vessel positioning. At a predetermined pressure level at the source area of the piston, a spring biased trigger valve allows the flow of pressure fluid to the large area of the piston whereby the clutch can reach full clutch capacity. The system offers seamless transition from modulating operation of the clutch where engine speed can be increased slightly to full engagement of the clutch.

The dual area clutch provided by the present invention provides smooth transition from the initial docking mode and provides for precise and rapid back and forth changes in speed for maneuvering in the docking procedure.

More specifically, the valve of the present invention is located on the housing of the transmission and exteriorly on the housing for easy access to the valve for adjustment and service thereof.

These and other objects and advantages of the invention will appear as this disclosure progresses.

DESCRIPTION OF THE PREFERRED EMBODIMENT

Figure 1:
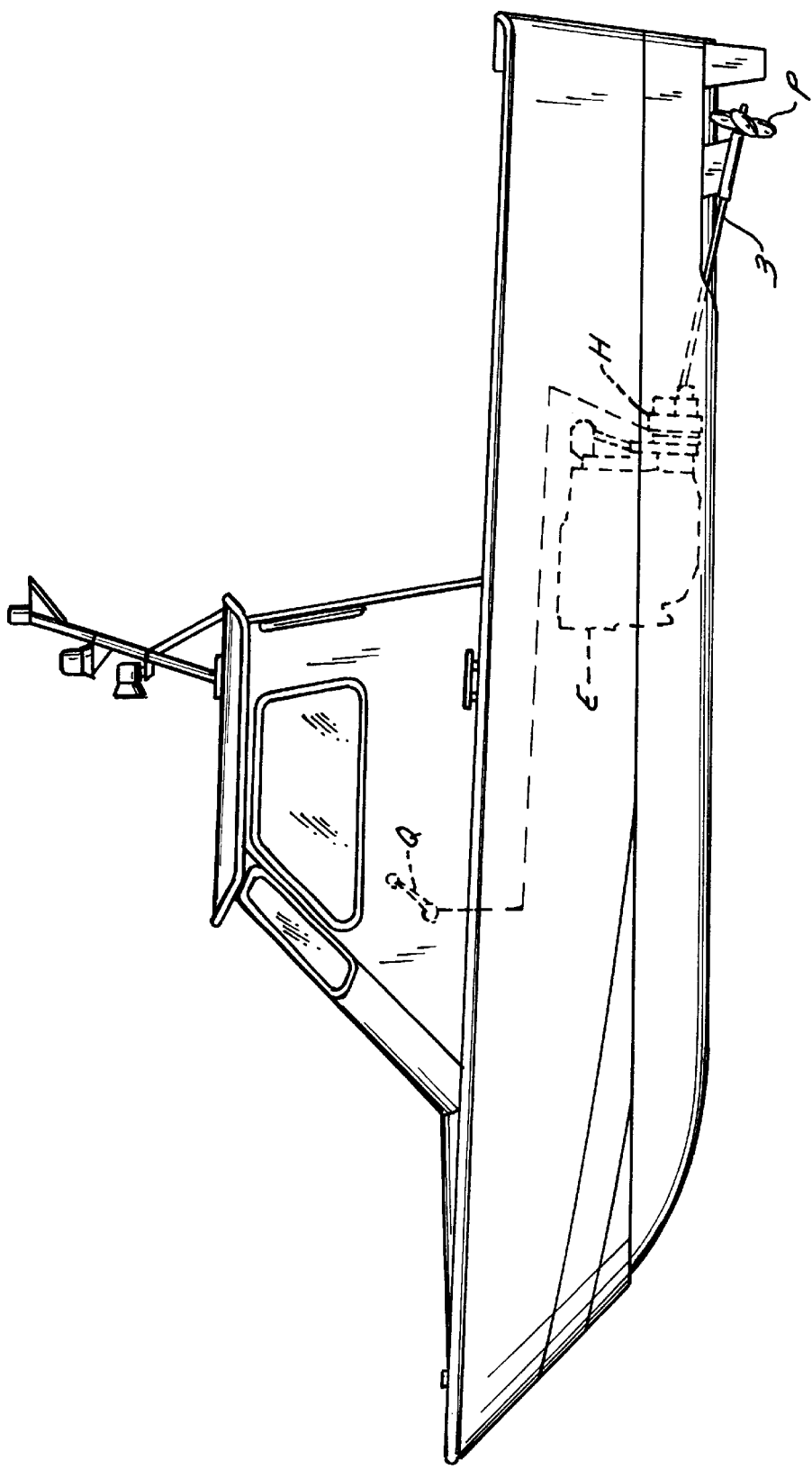
FIG. 1 is a side elevational view of a marine craft utilizing the present invention.

FIG. 1 is a side elevational view of a marine craft utilizing the present invention and includes an engine E to which is coupled the transmission housing H and from which extends the propeller shaft 3 having the propeller P at the end thereof in the known manner.

Figures 2, 3:
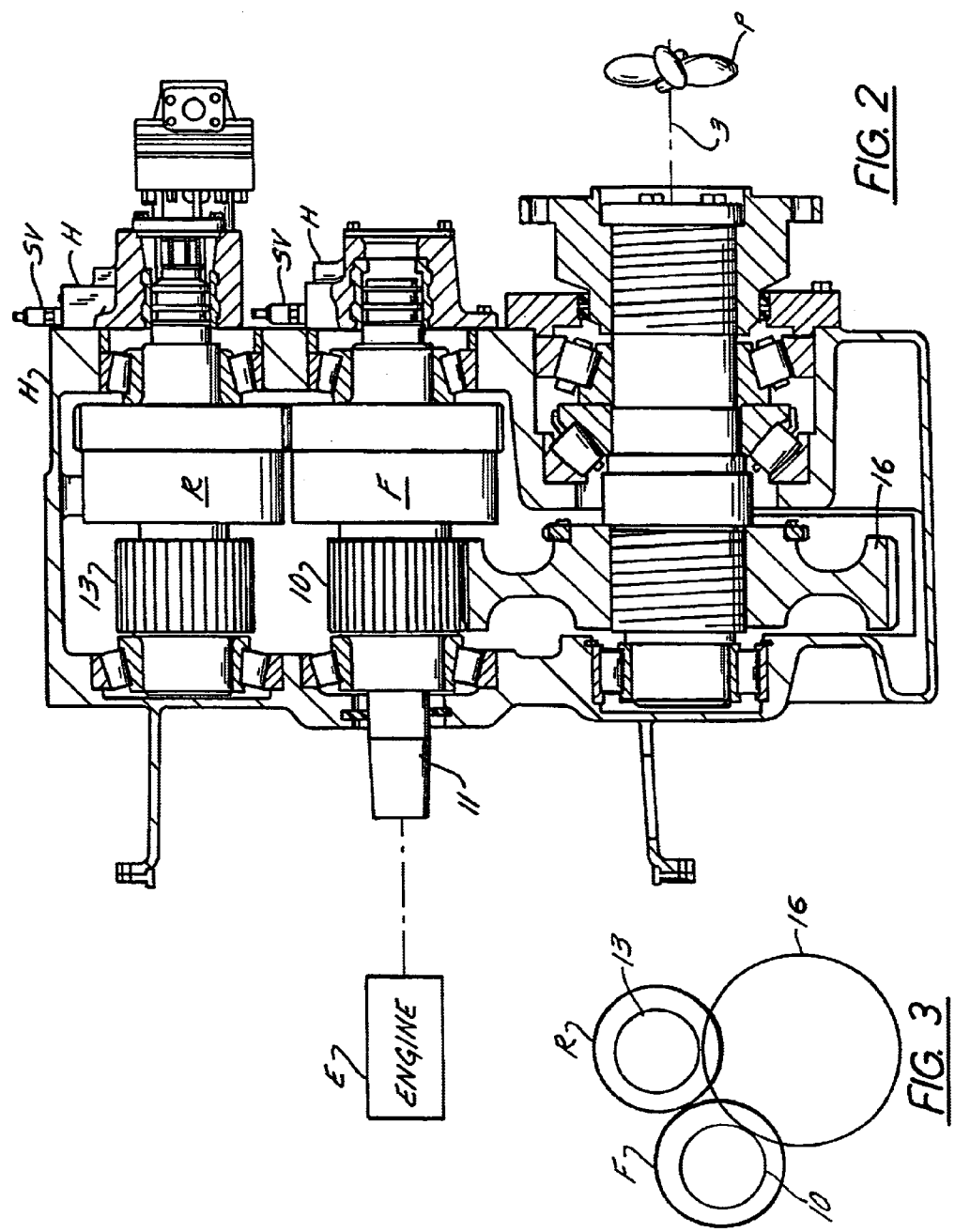
FIG. 2 is a longitudinal cross-sectional view through a transmission housing of the present invention and includes a showing of both the forward and reverse clutches, the rear clutch being shown as rotated around the input shaft from its normal position and into a plane with the forward clutch for clarity in the drawings.
FIG. 3 is a transverse, cross-sectional, schematic view on a reduced scale showing the usual relative positions of the two clutches and the output shaft as shown in FIG. 2.
Figure 4:
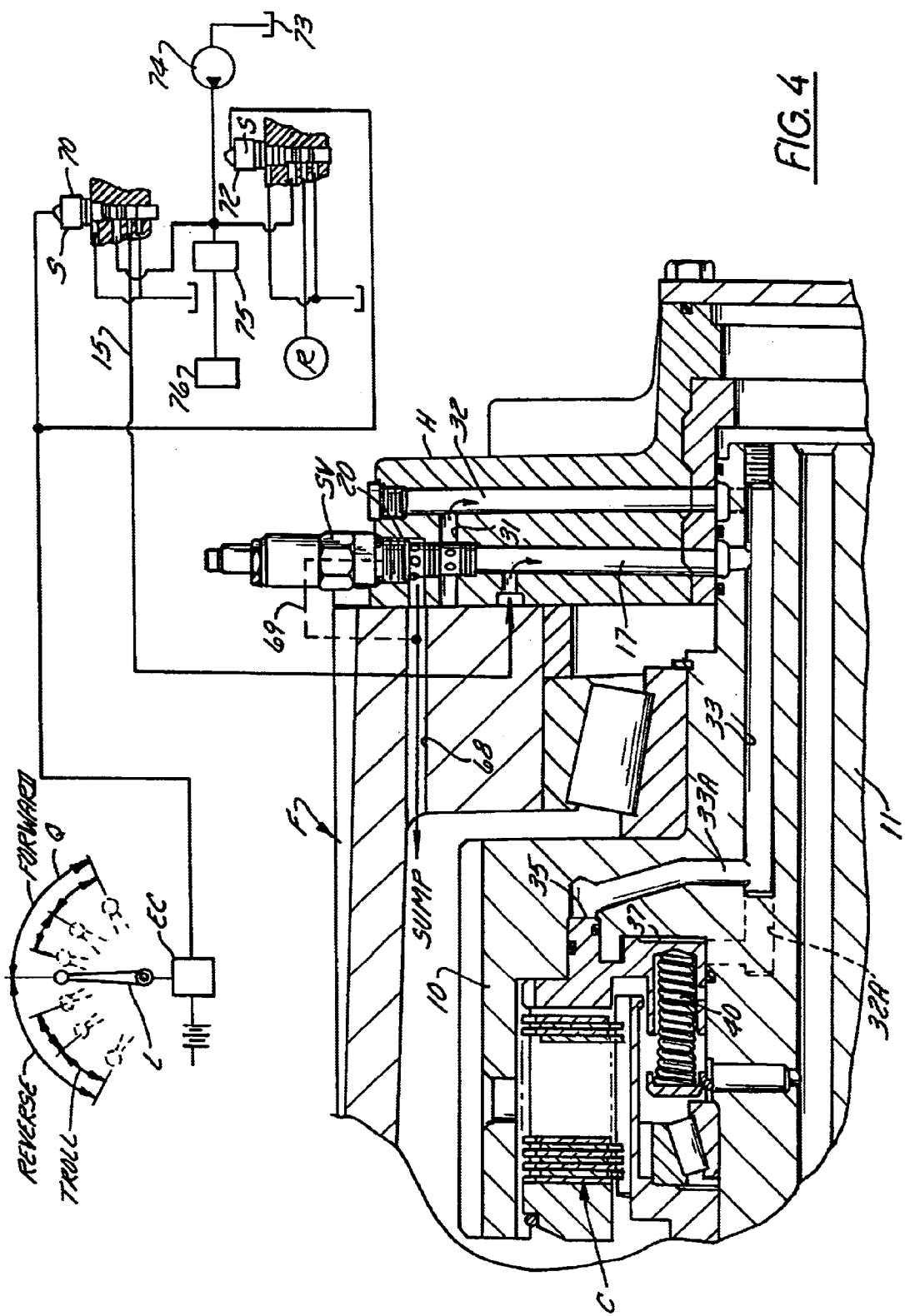
FIG. 4 is an enlarged, fragmentary longitudinal, cross-sectional view through the forward clutch F shown in FIG. 2 and showing the control quadrant and electric solenoid control valves for furnishing fluid pressure to the trigger valves.

A hand operated control quadrant Q is shown in FIGS. 1 and 4, which in turn is connected to the electric solenoids S of proportional valves 70 and 72 shown in FIG. 4 which act in the known manner to deliver pressure fluid from a conventional source such as the pump 74 and deliver it via pressure line 15 to either one of the two trigger or sequence valves SV. (These trigger or sequence valves SV are shown in FIGS. 2, 4, 5 and 6.) As shown in FIG. 2, the transmission utilizing the present invention includes a forward clutch F and a rearward clutch R which are meshed together by their gears 10 and 13, respectively. These gears 10 and 13 are also in constant mesh with the large output gear 16 (FIG. 3) which is secured to the output shaft 3 to drive the propeller P in the known manner.

The shaft for these clutches are journaled in suitable roller bearings shown in the drawings and in the known manner which in turn are mounted in the transmission housing H.

The sequence valve SV, commonly referred to as a trigger valve, is shown in FIG. 2, one such valve being associated with the forward clutch F and the other similar valve SV being associated with the reverse clutch pack R. Enlarged cross-sectional views of the valve SV are shown in FIGS. 5 and 6, FIG. 5 showing the valve in the clutch fully engaged position and FIG. 6 showing the valve in the neutral position.

Figure 5:
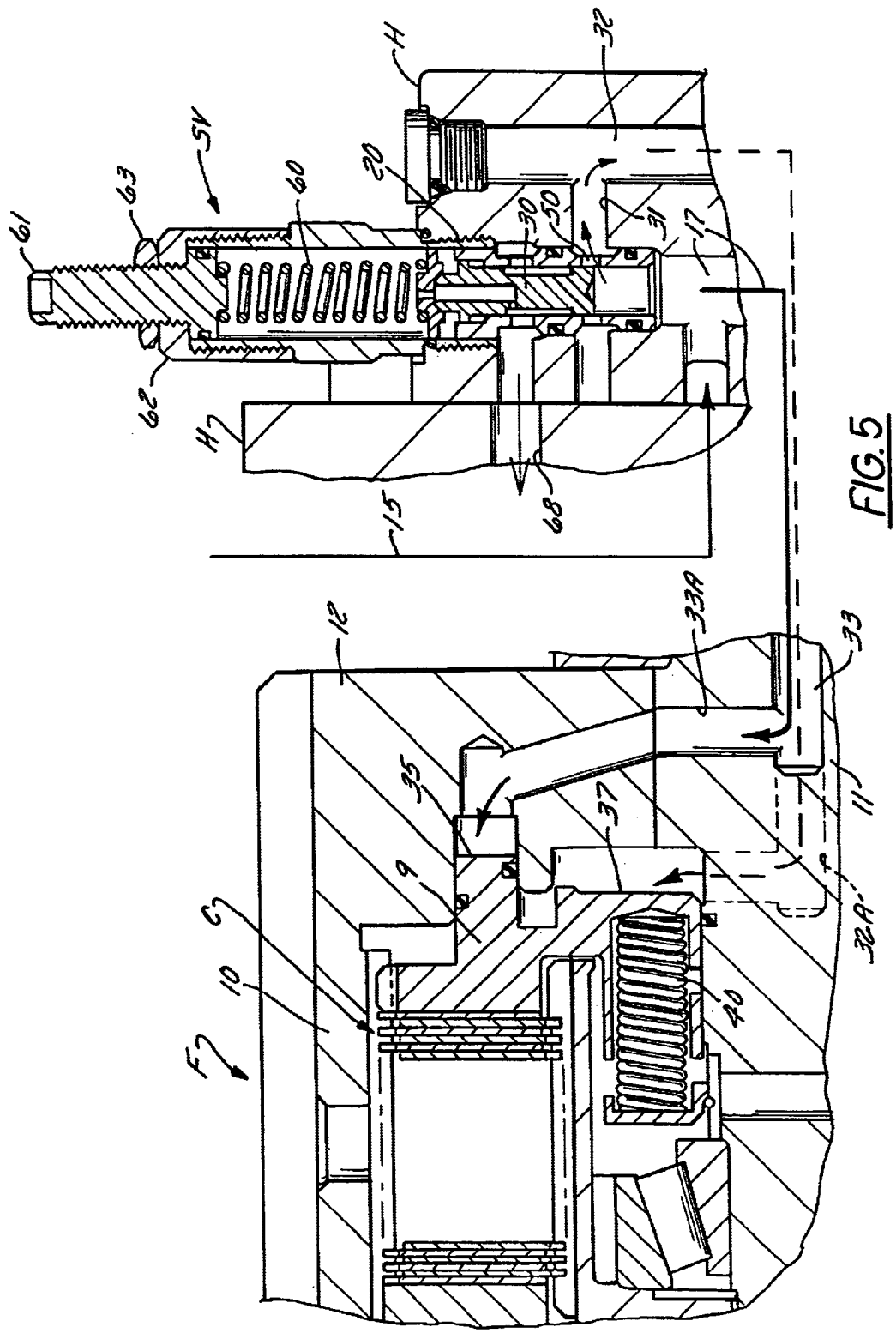
FIG. 5 is a view similar to a portion of FIG. 4, but on a slightly enlarged scale and also showing the trigger valve in enlarged cross section and in a clutch fully engaged position.
Figure 6:
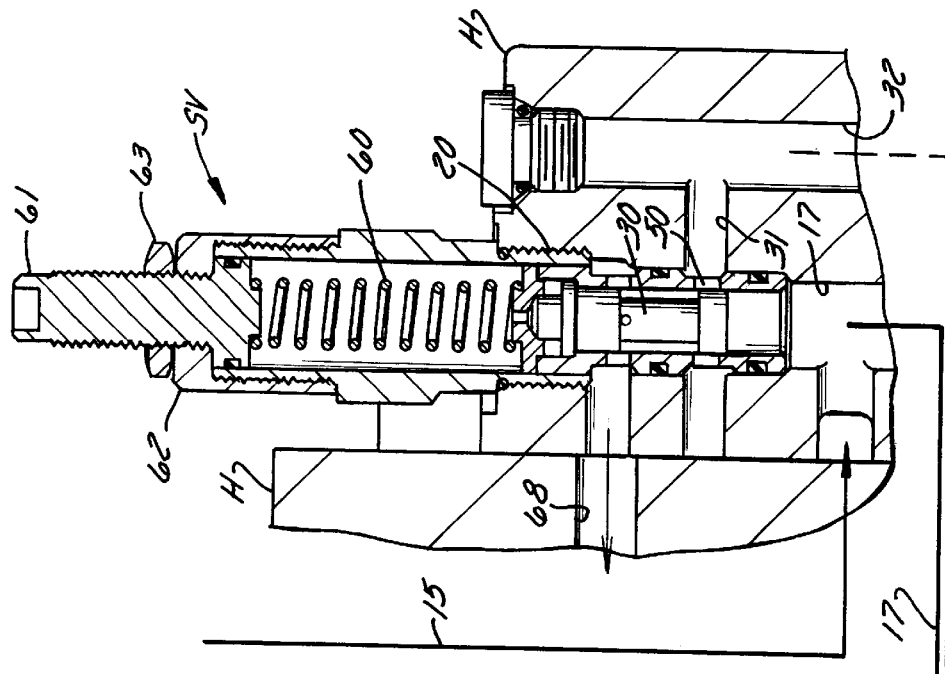
FIG. 6 is a view similar to FIG. 5 but showing the trigger valve in a clutch neutral position.
Figure 6:
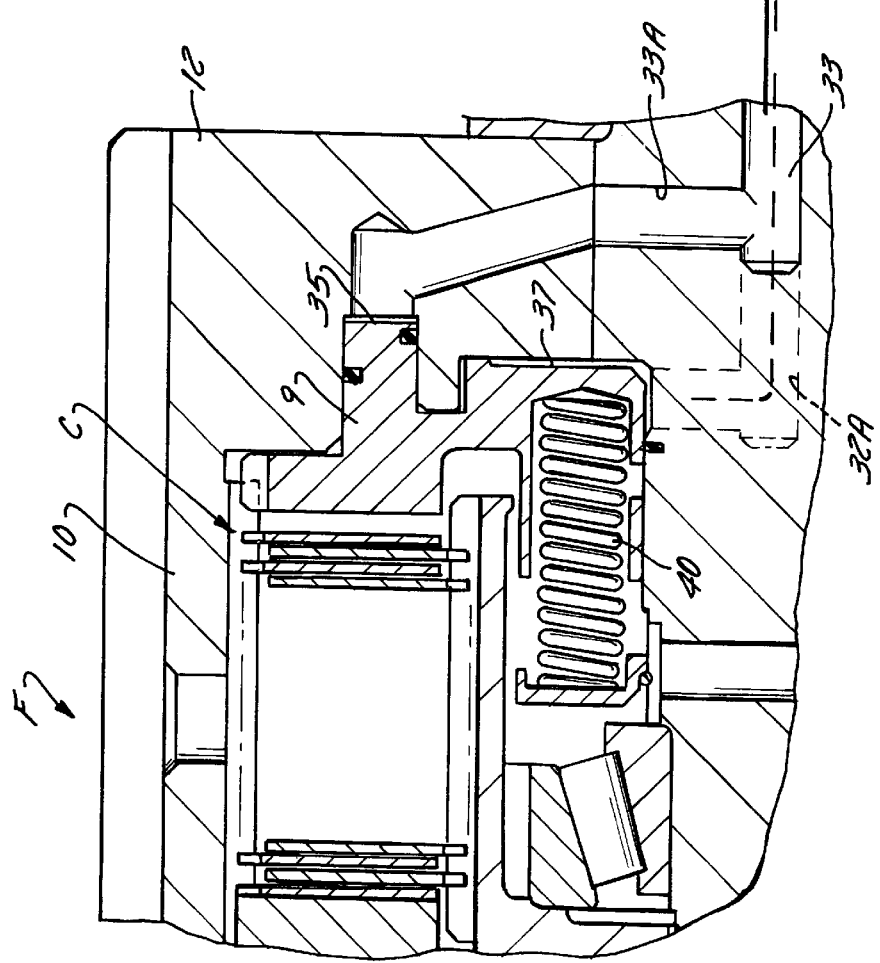

Referring to FIG. 4, pressure fluid is delivered via line 15 to the housing passage 17 which communicates with the lower end of the sequence valve SV, as shown clearly in FIGS. 4, 5 and 6.

It will be noted that the valve SV is threadably mounted at 20 in the housing H (FIG. 5) so that it can be easily secured to and removed from the housing and from the outside of the housing H.

The spool 30 of valve SV, as shown in FIG. 5, has been raised sufficiently by pressure from the small area 35 of the clutch, to allow fluid pressure to flow via passage 31 and to passage 32 in the housing. Fluid pressure is also permitted to flow from pressure line 15 and to the passage 17 previously mentioned. Fluid pressure is always available in passage 17, which communicates via the passage 33 (FIGS. 3 and 5) in the clutch shaft 11 where the extension 33A of passage 33 communicates with a small piston area 35 of the clutch. Thus, when the sequence valve SV permits pressure fluid to flow through passages 31 and 32, fluid is also permitted to flow through passages 33A and to the small piston area 35.

When in this position, both the large piston area 37 and the small piston area 35 are pressurized and the clutch is in the fully engaged position.

The ratio of the area of the small piston to the area of the large piston is preferably one to four.

In other words, when the valve SV is in the position shown in FIG. 5 (with the spool 30 raised), the clutch is in the fully engaged position because fluid pressure is simultaneously admitted to both the small piston area 35 and the large piston area 37. This fully engaged position of the clutch occurs when the pressure in the small piston area 35 is sufficient to cause the piston 9 to shift (to the left) against the action of the clutch return spring 40. This increases pressure in the small piston area 35 so as to cause pressure on the bottom of the valve SV to raise the spool 30, thus opening passage 50 in the lower body of the valve and consequently permitting fluid pressure to pass through passage 31, passages 32 and 32A in the shaft and to the large piston area 37. This increased pressure on the piston area 37 causes the entire piston 9 to shift to the left as viewed in FIG. 5 to the clutch fully engaging position.

Thus, the valve SV acts in sequence to permit fluid pressure to flow to the large area piston when the pressure in the small area piston is sufficient to raise spool 30 and thus open the passageway to the large piston area 37.

It will be noted in FIG. 5 or FIG. 6 that the spool 30 of the valve is spring loaded downwardly by the spring 60. In turn, the pressure of the spring 60 is adjusted by the threaded member 61 in the valve body 62. A lock nut 63 is provided at the upper end of the valve and around the adjusting member 61 and this adjusting nut 63 is readily accessible for quick and easy adjustment of the valve SV. A sump passage 69 (FIG. 4) extends from the valve body so as to permit pressure fluid to be dumped to the sump line 68, as necessary.

By mounting the sequence valve SV on the outside of the housing H of the transmission, it is conveniently positioned for quick and easy adjustment, installation and removal for repair as necessary.

As shown in schematic FIG. 3, the gears 10, 13 and 16 are in constant mesh. The reverse clutch R is used to reverse output direction.

Referring to the schematic diagram in the control system in FIG. 4, a control lever L is utilized, through an electronic controller EC, to select operation of the either the forward or the reverse clutch. When the lever L is moved to the right, it causes actuation of the forward clutch. Conversely, when the lever L is moved to the left, it causes actuation of the reverse clutch. It will be noted that the lever has a troll position in either forward or reverse. When the lever is moved from neutral to the troll position, the clutch operates in a troll mode. Then further movement of the lever acts to cause increase in engine speed.

Figure 7:
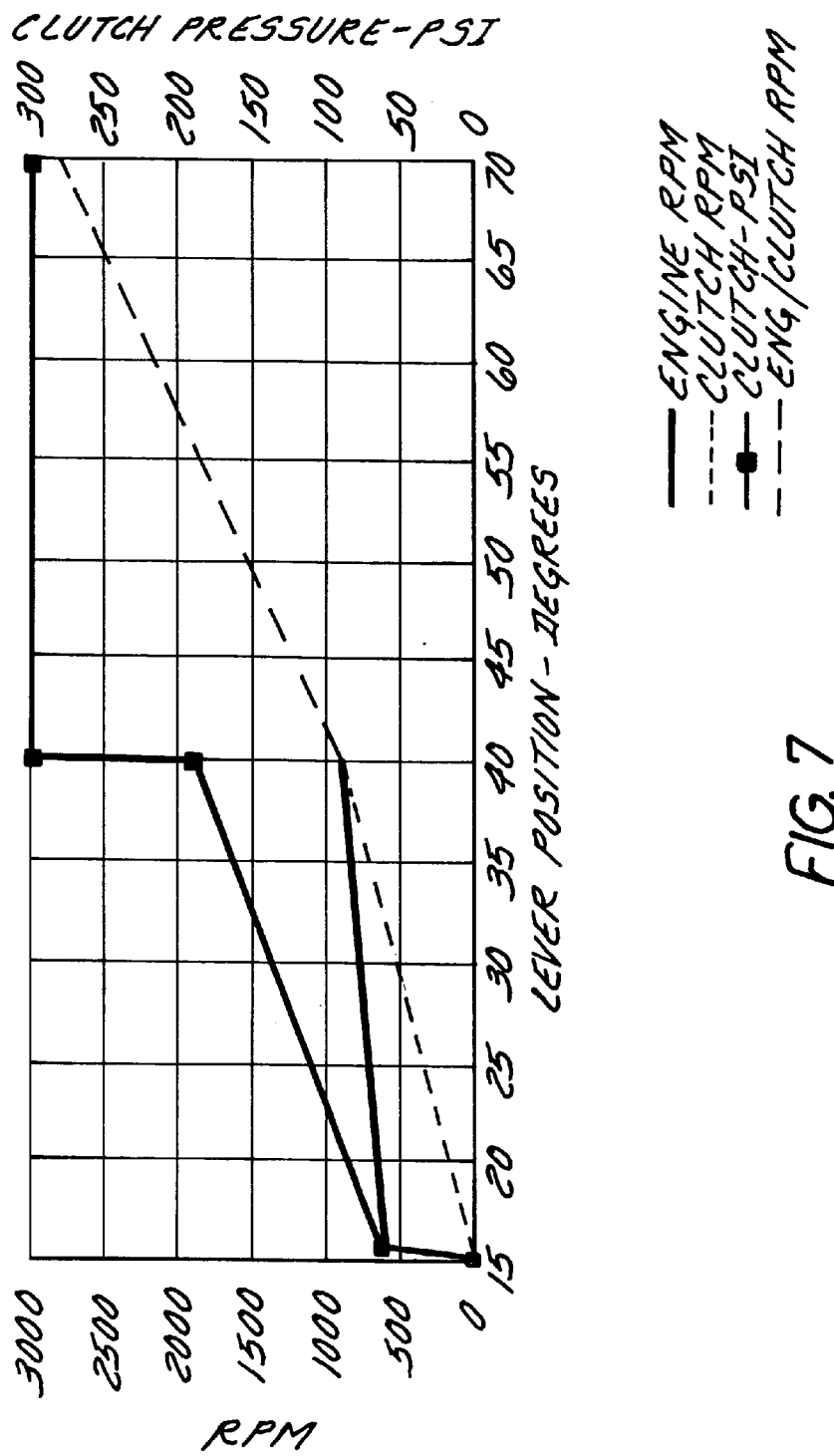
FIG. 7 is a graph showing the characteristics of the clutch wherein the position of the control lever in degrees is plotted against the engine RPM, the clutch RPM and the engine/clutch RPM.

As shown in FIGS. 4 and 7, when the lever reaches the 40° mark, continued movement of the lever increases the engine/clutch rpm as shown. It also increases the clutch pressure as shown on the right-hand side of the graph. The proportional valve 70 is provided for the forward clutch F and the proportional valve 72 is provided for the reverse clutch R. Proportional valves 70 and 72 are similar and operate to draw pressure fluid from the source 73 and direct it to either clutch F or clutch R, respectively. Pressure fluid is also directed to a main regulator 75 (FIG. 4) and lubrication passage 76 for lubricating the drive plates and bearings of the clutches in the known manner.

Generally, the electronic control (EC) is microprocessor-based and sends a pulse width modulated (PWM) signal to control the proportional valves 70 and 72 for each clutch. The level of the PWM signal sent to the valves is directly related to the position of lever L. By utilizing the small area 35 of the clutch, a wide pressure differential is realized to modulate the clutch. Thus, the electronic control (EC) is programmable to allow the engine speed to match the propeller horsepower selected for clutch synchronization.

Recapitulation

The present invention provides for a marine transmission system for variable speed control comprising an electronic control system and dual area clutch pistons. Clutch capacity is varied by separate fluid areas to the clutch, one area being smaller than the other. The marine transmission clutch is modulated via the small area of the piston utilizing a selectively operable control allowing variable propeller speed. Fluid is supplied to the small area by controlling a proportional valve via the control. Modulation offers enhanced docking control and vessel positioning. At a predetermined level, a spring biased trigger valve controls the fluid to the large area of the piston to reach full clutch capacity.

The initial actuation or modulation of the clutch is utilized, for example, for marine boats for docking and vessel positioning. The fluid pump 74 (FIG. 4) which supplies fluid to the proportional valves 70 or 72 provides fluid pressure. The lever L in the quadrant shown in FIG. 4, which is movable from a neutral position to a detent position and then to forward position, actuates the valves 70 and 72. Similarly, the quadrant can be swung in the opposite direction for reverse of the transmission when fluid is directed to the other proportional valve 72 for reverse operation of the transmission. In either direction, pressure fluid is first admitted to the small piston area 35 and after it reaches a certain pressure, the piston is urged to open against the pressure of its spring 40 and permit pressure fluid to flow to the large piston area 37. The arrangement provides for a variable speed control and clutch capacity is varied by separate fluid areas of the clutch, one area being smaller than the other area. The transmission clutches are modulated via the small area of the piston utilizing a selectively operable control allowing variable output speed.

Modulation of the clutch offers docking control and vessel positioning. Then at a predetermined pressure level, the spring biased trigger or sequence valve controls the flow of fluid to the large area of the piston to thereby cause it to reach full clutch capacity. This system provides seamless transition from modulation to full engagement. During modulation, engine speed can be increased slightly. After modulation the engine throttle is controlled.

What is claimed is:

1. A transmission housing, a modulatable power transmission clutch mounted within said housing and including interleaved clutch plates, said clutch having a central power transmitting shaft extending axially through said clutch mounted thereon, said clutch including a fluid operated movable piston for effecting clutch operation by compression of said plates, said piston having smaller and larger piston areas thereon, the smaller piston area being adapted to have fluid flow directed thereto at a variable fluid pressure whereby said clutch is modulatable, the larger piston area being adapted to have fluid flow directed thereto to effect maximum and unmodulatable engagement of said clutch;

and a spring loaded normally closed sequence valve mounted on the exterior of said transmission housing and accessible from the exterior thereof;

said sequence valve for controlling fluid flow to said larger piston area in response to fluid pressure above a predetermined amount at said smaller piston area, said valve being normally closed whereby pressure fluid is directed to said smaller piston area at a variable fluid pressure whereby said clutch is modulatable, and when said valve is open by said fluid pressure over a predetermined amount permits fluid flow to said larger piston area to effect maximum and unmodulatable engagement of said clutch for full clutch capacity.

2. A power transmission housing, a marine transmission located in said housing and for variable speed control of a boat having a propeller for providing modulatable lower speed in both forward and reverse direction for maneuvering during docking of said boat to provide enhanced docking control and boat positioning;

said transmission providing seamless transition from modulation during which speed can be increased slightly to full clutch engagement and capacity for driving said propeller;

said transmission including a modulatable power transmission clutch including interleaved clutch plates, said clutch comprising a power transmitting shaft extending axially and centrally through said clutch mounted thereon, said clutch including a fluid operated movable piston for effecting clutch operation by compression of said plates, said piston having two separate fluid application piston areas of different areas thereon, one smaller of said piston areas being adapted to have fluid flow directed thereto at a variable fluid pressure whereby said clutch is modulatable for said docking, the other larger of said piston areas being adapted to have fluid flow directed thereto to effect maximum and unmodulatable engagement of said clutch for driving said propeller;

and a sequence valve for controlling fluid flow to said other larger of said piston areas in response to fluid pressure at said one smaller of said piston areas, said sequence valve being mounted on said transmission housing and at the exterior of said housing, said valve being spring loaded to a normally closed position in which pressure fluid is directed to said one smaller piston area at a variable fluid pressure whereby said clutch is modulatable, and when said valve is open it permits fluid flow to said other larger of said piston area to effect maximum and unmodulatable engagement of said clutch for full clutch capacity available to said propeller.

3. A power transmission housing, a power transmission in said housing and including a forward modulatable power transmission clutch and a rear modulatable power transmission clutch, said forward clutch connected in power receiving connection with a prime mover and in power delivering connection with load to be driven, said rear clutch being connected in driven engagement with said forward clutch and engageable with said load to be driven for driving the latter in a reverse direction, said forward and rear clutches each including clutch plates, a power transmitting shaft extending axially and centrally therethrough, said clutches each including a fluid operated movable piston for effecting clutch operation by compression of said plates, said piston having two separate fluid application piston areas of different areas thereon, one smaller of said piston areas being adapted to have fluid flow directed thereto at a variable fluid pressure whereby said clutch is modulatable, the other larger of said piston areas being adapted to have fluid flow directed thereto to effect maximum and unmodulatable engagement of said clutch;

and sequence valve means for controlling fluid flow to said other larger of said piston areas in response to fluid pressure above a predetermined amount at said one smaller of said piston areas, said sequence valve means being mounted on the exterior of said housing and accessible therefrom, said sequence valve means being spring loaded to a normally closed position in which pressure fluid is directed to said one smaller piston area at a variable fluid pressure whereby said clutch is modulatable, and when said valve means is open it permits fluid flow to said other larger of said piston area to effect maximum and unmodulatable engagement of said clutch for full clutch capacity.

4. A power transmission housing, a marine transmission mounted in said housing for variable speed control of a boat having a propeller for providing modulatable lower speed in both forward and reverse direction for maneuvering during docking of said boat to provide enhanced docking control and boat positioning;

said transmission providing seamless transition from modulation during which speed can be increased slightly to full clutch engagement and capacity for driving said propeller;

said transmission including a forward modulatable power transmission clutch and a rear modulatable power transmission clutch, said forward clutch connected in power receiving connection with a prime mover and in power delivering connection with load to be driven, said rear clutch being connected in driven engagement with said forward clutch and engageable with said load to be driven for driving the latter in a reverse direction, said forward and rear clutches each including clutch plates, a power transmitting shaft extending axially and centrally therethrough, said clutches including a fluid operated movable piston for effecting clutch operation by compression of said plates, said piston having two separate fluid application piston areas of different areas thereon, one smaller of said piston areas being adapted to have fluid flow directed thereto at a variable fluid pressure whereby said clutch is modulatable for said docking, the other larger of said piston areas being adapted to have fluid flow directed thereto to effect maximum and unmodulatable engagement of said clutch for driving said propeller;

and for each of said forward and rear clutches, a trigger valve for controlling fluid flow to said other larger of said piston areas in response to fluid pressure above a certain value at said one smaller of said piston areas, a first pressure fluid passage in said shaft for conducting pressure fluid to said smaller area and a second pressure fluid passage in said shaft for conducting pressure fluid to said larger piston area, said trigger valve being located on an outer side of said transmission housing and easily accessible from the outside of said housing, said trigger valve being spring loaded to a normally closed position in which pressure fluid is directed to said one smaller piston area at a variable fluid pressure whereby said clutch is modulatable, said trigger valve when closed acting to block flow of fluid below a predetermined pressure to said larger area, and when said trigger valve is open acting to permit fluid flow above a predetermined pressure to said larger area of said piston to effect maximum and unmodulatable engagement of said clutch for full clutch capacity, and an electronic control circuit for said transmission including a source of pressure fluid, a proportional valve connected to said source for delivering pressure fluid to said rear clutch, said source connected to another proportional valve for delivering pressure fluid to said forward clutch, said circuit also including a control lever operatively connected with said proportional valves for selective operation thereof to effect forward or reverse operation of said boat.

* * * * *